United States Patent [19]
Chi

[11] Patent Number: 4,742,111
[45] Date of Patent: May 3, 1988

[54] PHENOLIC RESIN-CONTAINING AQUEOUS COMPOSITIONS

[75] Inventor: Frank K. Chi, Williamsville, N.Y.

[73] Assignee: Dow Corning Corporation, Midland, Mich.

[21] Appl. No.: 64,636

[22] Filed: Jun. 22, 1987

Related U.S. Application Data

[63] Continuation of Ser. No. 799,717, Nov. 19, 1985, abandoned, which is a continuation of Ser. No. 668,046, Nov. 5, 1984, Pat. No. 4,584,340.

[51] Int. Cl.$^4$ .............................................. C08K 3/36
[52] U.S. Cl. ...................................... 524/596; 524/841
[58] Field of Search ............... 524/595, 596, 841, 261, 524/262, 263, 264, 265, 267

[56] References Cited

U.S. PATENT DOCUMENTS

| | | | |
|---|---|---|---|
| 3,444,119 | 5/1969 | Blanc | 524/595 |
| 3,616,179 | 10/1971 | McCombs et al. | 524/595 |
| 4,045,397 | 8/1977 | Parkinson | 524/262 |
| 4,330,446 | 5/1982 | Miyosawa | 428/418 |
| 4,584,340 | 4/1986 | Chi | 524/261 |

*Primary Examiner*—Lewis T. Jacobs
*Attorney, Agent, or Firm*—Robert L. McKellar

[57] ABSTRACT

What is disclosed are aqueous compositions which are useful for coating solid substrates such as glass, plastic and metal. The aqueous compositions comprise colloidal silica, a phenolic resin, water and at least one hydrolyzable silane. An example of such a composition is colloidal silica, phenolic resin, water and $CH_3SiO_{3/2}$ obtained from $CH_3Si(OCH_3)_3$.

5 Claims, No Drawings

PHENOLIC RESIN-CONTAINING AQUEOUS COMPOSITIONS

BACKGROUND OF THE INVENTION

This application is a continuation application of U.S. Ser. No. 799,717, filed Nov. 19, 1985, now abandoned, which is a continuation application of U.S. application Ser. No. 668,046 filed Nov. 5, 1984, now U.S. Pat. No. 4,584,340 issued on Apr. 22, 1986.

This invention relates to aqueous compositions that contain phenolic resins in combination with colloidal silica, silanes and water. In another aspect, this invention deals with the use of such compositions as coatings on solid substrates.

This invention falls generally into the class of colloidal silica based aqueous compositions which have been developed over the past fifteen years for use on certain substrates to prevent abrasion of the substrates or for corrosion protection of the substrates. There is always a need for a less expensive, more forgiving type of product, especially for use in the transparent glazing applications that include, for example, glazing for autos, buses and aircraft and vandal-proof windows in public buildings. The synthetic organic polymers useful in these applications, namely polycarbonate and acrylic polymers are easily fabricated into useful articles, such as glazing, but because of their low density, they are more subject to abrasion. Further, it appears as though this class of aqueous compositions have some utility in the protection of metal substrates, especially aluminum articles used in automotive decorative trim and aluminum articles used as decorative trim in modern homes.

As indicated supra, there are many aqueous compositions available in the prior art. For example, U.S. Pat. No. 3,986,997, issued Oct. 19, 1976 (Clark) discloses acidic dispersions of colloidal silica and hydroxylated silsesquioxanes in alcohol-water medium which are coated on plastic substrates and heat cured to give transparent abrasion resistant coatings. This same type of coating is disclosed in many other patents.

Also, these types of aqueous compositions have been modified with organic polymers in order to change the properties of the composition both as a storable liquid material and as a cured coating.

For example, Miyosawa, U.S. Pat. No. 4,016,129, issued Apr. 5, 1977 describes a hardenable coating composition which forms a transparent, flexible, hard and non-combustible coating which comprises an aqueous dispersion of silica and polyvinyl alcohol as a complex prepared by the reaction between colloidal silica dispersions and polyvinyl alcohol at a temperature about 50° C. The reaction is allegedly accelerated by the presence of di- or trialkoxysilanes. These coatings appear to have less abrasion resistance than the inventive compositions.

Also, Miyosawa, in U.S. Pat. No. 4,330,446, issued May 18, 1982, describes a coating composition for metal surface treatment which contains colloidal silica, silane and organic polymer resins such as acrylics, alkyds, polyesters and epoxy-esters. These coatings when tested had low abrasion resistance (pencil hardness 2H) and most were not clear coatings.

Nason, in U.S. Pat. No. 2,182,208, issued Dec. 5, 1939, describes the preparation of a silicone modified non-aqueous phenolic resin by heating silicon esters or halides with phenol and formaldehyde in benzene. The benzene and by-produced alcohol were distilled away at reduced pressure. The residual resin is useful as a varnish. The silicon esters and silicon halides used were $Si(OR)_4$ and $SiX_aR'_{(4-a)}$, respectively, where R is alkyl, R' is alkyl or aryl, X is halogen and a is the number of halogen atoms. A similar non-aqueous composition is described by Martin et al. in U.S. Pat. No. 2,707,191, issued Apr. 26, 1955. These compositions comprise the condensation reaction product of methylol benzene compounds and hydrolyzable silanes. This material, in a solvent solution, i.e. toluene, could be heat cured to a hard tack-free film.

THE INVENTION

It now has been found that abrasion and corrosion resistant coatings can be prepared from a novel aqueous composition of matter.

This invention therefore deals with a novel composition of matter which is an aqueous composition comprising (A) a phenolic resin; (B) colloidal silica; (C) a partial condensate, or a mixture of partial condensates, from silanes having the general formula $RSi(OR')_3$ wherein R' is methyl or ethyl and R is independently selected from a group consisting of (i) alkyl radicals having 1 to 3 inclusive carbon atoms; (ii) the $CH_2=CH-$ radical; (iii) the $C_6H_5-$ radical; (iv) substituted alkyl radicals having the formulae

  (a)

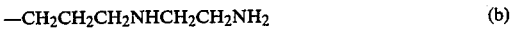  (b)

  (c)

  (d)

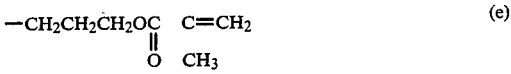  (e)

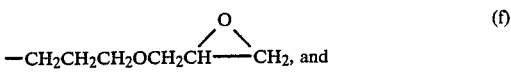  (f)

  (g)

(D) water.

This invention further deals with the use of the novel compositions to coat solid substrates to render the substrates abrasion resistant and/or corrosion resistant.

A further object of this invention deals with solid substrates coated with the compositions of this invention.

In accordance with this invention therefore there is provided an aqueous composition comprising an aqueous dispersion of colloidal silica and/or a solution of a partial condensate of a silanol of the formula $RSi(OH)_3$, or mixtures of $RSi(OH)_3$, which are derived from silanes having the formula $RSi(OR')_3$ wherein R' is methyl or ethyl and in which R is selected from the group consisting of alkyl radicals of 1 to 3 carbon atoms, the vinyl radical, the phenyl radicals, the 3,3,3-trifluoropropyl radical, the gamma-glycidoxy radical, the gamma-methacryloxypropyl radical, the chloropropyl radical, the mercapto propyl radical, the gamma-aminoethyl(aminopropyl) radical, and the gamma-aminopropyl radical; and a phenolic resin.

In one aspect of this invention, the non-volatile portion of the composition is composed of colloidal silica, partial condensate (or a mixture of partial condensates, that is, where R represents, in individual condensates, different radicals) and phenolic resins.

In another aspect of this invention, the non-volatile portion of the composition is composed of a phenolic resin and a partial condensate, or mixtures of partial condensates.

In still another aspect of this invention, the non-volatile portion of the composition is composed of a phenolic resin and colloidal silica.

A preferred embodiment of this invention is an aqueous composition comprising (A) 100 parts by weight phenolic resin; (B) 1 to 100 parts by weight of colloidal silica; (C) 1 to 100 parts by weight of a partial condensate, or a mixture of partial condensates, from silanes having the general formula RSi(OR')$_3$ wherein R' is methyl or ethyl and R is independently selected from a group consisting of (i) alkyl radicals having 1 to 3 inclusive carbon atoms; (ii) the CH$_2$=CH— radical; (iii) the C$_6$H$_5$— radical; (iv) substituted alkyl radicals having the formulae —CH$_2$CH$_2$CH$_2$NH$_2$      (a)

—CH$_2$CH$_2$CH$_2$NHCH$_2$CH$_2$NH$_2$      (b)

—CH$_2$CH$_2$CH$_2$SH      (c)

—CH$_2$CH$_2$CH$_2$Cl      (d)

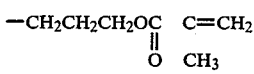      (e)

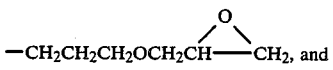, and      (f)

—CH$_2$CH$_2$CF$_3$ and,      (g)

(D) 450 to 1900 parts by weight of water.

A further preferred embodiment of this invention is an aqueous composition comprising (A) 100 parts by weight phenolic resin; (B) 1 to 100 parts by weight of a partial condensate, or a mixture of partial condensates, from silanes having the general formula RSi(OR')$_3$ wherein R' is methyl or ethyl and R is independently selected from a group consisting of (i) alkyl radicals having 1 to 3 inclusive carbon atoms; (ii) the CH$_2$=CH— radical; (iii) the C$_6$H$_5$— radical; (iv) substituted alkyl radicals having the formulae —CH$_2$CH$_2$CH$_2$NH$_2$      (a)

—CH$_2$CH$_2$CH$_2$NHCH$_2$CH$_2$NH$_2$      (b)

—CH$_2$CH$_2$CH$_2$SH      (c)

—CH$_2$CH$_2$CH$_2$Cl      (d)

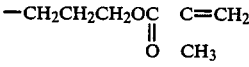      (e)

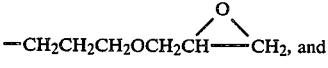, and      (f)

—CH$_2$CH$_2$CF$_3$ and,      (g)

(C) 300 to 1900 parts by weight of water.

Still another preferred embodiment of this invention is an aqueous composition comprising (A) 100 parts by weight phenolic resin; (B) 1 to 100 parts by weight of colloidal silica; and (C) 300 to 1900 parts by weight of water.

These compositions cure to clear polymer coatings with a high crosslink density and low free volume. Thus, such coatings will exhibit abrasion resistance, solvent resistance and corrosion resistant.

In that aspect of the invention where there is present no colloidal silica, it has been found that those compositions provide good to excellent hydrochloric acid corrosion resistance on aluminum substrates when there is less than 100 parts of the partial condensate for every 100 parts of phenolic resin, for example, less that 80 parts of partial condensate for every 100 parts of phenolic resins. Also, they provide enhanced abrasion resistance on plastics when there is also present in the composition, the silsesquioxane,

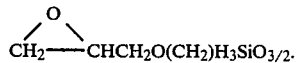

In that aspect of this invention, where there is present no partial condensate, it has been found that those compositions provide abrasion resistance on plastic substrates and hydrochloric acid corrosion resistance on aluminum substrates when the phenolic resin is present in the amount of less than or equal to fifty percent of the coating composition and the colloidal silica constitutes fifty percent or more, by weight, of the coating composition.

The type of colloidal silica of this composition is not narrowly critical but generally such colloidal silica useful in this invention is an aqueous dispersion having a particle size in the range of 5 to 150 millimicrons in diameter. These silica dispersions are prepared by methods well-known in the art and they are commercially available under such registered tradenames as "Ludox" manufactured by DuPont, Wilmington, Del., U.S.A. and "Nalcoag" manufactured by Nalco Chemical Company, U.S.A. It is preferred to use colloidal silica of 10 to 30 millimicrons particle size in order to obtain dispersions having a greater stability and to provide cured coatings having superior optical properties. Included also within the definition of colloidal silica, for purposes of this invention, are those silicas produced by the hydrolysis and condensation of orthosilicates, such as tetraethylorthosilicate.

The silica is dispersed in a solution of the partial condensate carried in water soluble or water miscible solvents. Under certain circumstances, it is helpful to also have present, small amounts of water immiscible solvents, such as toluene or xylene. Generally, for use in this invention, no more than ten weight percent of the solvent system should be water immiscible. The water miscible solvents of this invention are preferably lower aliphatic alcohols and the alcohol ethers, such as the Cellosolve ® solvents sold by the Dow Chemical Company, Midland, Mich., U.S.A. Most preferred are mixtures of the lower aliphatic alcohols and the alcohol ethers, for example, isopropanol (IPA) and butylcellosolve. Optionally, one can add other water miscible solvents such as ketones, for example, acetone. The partial condensate is generated in-situ by the action of the water in the composition on the alkoxy groups of the precursor trialkoxysilanes and the subsequent condensation of the silanols that are formed upon the hydrolysis. The partial condensate can be further characterized as a siloxanol polymer having at least one silicon-bonded hydroxyl group per every three —SiO— units. During curing, these residual hydroxyls condense to give silsesquioxanes, $RSiO_{3/2}$. Suitable precursor alkoxysilanes are those having three alkoxy groups on silicon and which, for example, can be $CH_3Si(OCH_3)_3$, $CH_3Si(OC_2H_5)_3$, $C_2H_5Si(OCH_3)_3$, $C_2H_5Si(OC_2H_5)_3$, $C_6H_5Si(OCH_3)_3$, $C_6H_5Si(OC_2H_5)_3$, $CH_2=CHSi(OCH_3)_3$, $CH_2=CHSi(OC_2H_5)_3$, $C_3H_7Si(OCH_3)_3$, $C_3H_7Si(OC_2H_5)_3$, $CF_3CH_2CH_2Si(OCH_3)_3$, $CF_3CH_2CH_2Si(OC_2H_5)_3$,

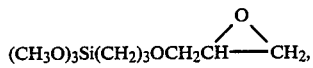

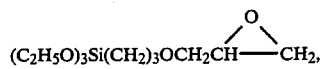

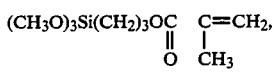

$(CH_3O)_3Si(CH_2)_3Cl$, $(CH_3O)_3Si(CH_2)_3SH$, $(CH_3O)_3Si(CH_2)_3NH(CH_2)_2NH_2$, $(CH_3O)_3Si(CH_2)_3NH_2$ and $(C_2H_5O)_3Si(CH_2)_3NH_2$.

The phenolic resins useful in this invention are those which are water miscible, or those which are soluble in water miscible solvents, such as those solvents described above. Preferred for this invention are the phenol-formaldehyde phenolic resins. Most preferred are the Novalac resins. An example of a phenolic resin useful in this invention is Resinox-RS7101, manufactured by the Monsanto Co., St. Louis, Mo., U.S.A.

The coating compositions are easily prepared by first adding trialkoxysilanes, such as $RSi(OCH_3)_3$, to colloidal silica hydrosols and adjusting the pH to the desired level by addition of an organic acid. The acid can be added to either the silane or the hydrosol prior to mixing the two components provided that the mixing is done rapidly. The amount of acid necessary to obtain the desired pH will depend on the alkali metal content of the silica but is usually less than one weight percent of the composition. Alcohol is generated by hydrolysis of the alkoxy substituents of the silane, for example, hydrolysis of one mole of $—Si(OC_2H_5)_3$ generates 3 moles of ethanol. Depending upon the percent solids desired in the final composition, additional alcohol, water or a water-miscible solvent can be added. The composition should be well mixed and allowed to age for a short period of time to ensure formation of the partial condensate. The coating composition thus obtained is a clear or slightly hazy low viscosity fluid which is stable.

Generally, the phenolic resins are added to the colloidal silica/partial condensate after the silica and partial condensate have been mixed and homogenized, but the order of addition is not narrowly critical.

Condensation catalysts can be added to the composition so that milder curing conditions can be utilized to obtain the optimum abrasion resistance or corrosion resistance in the final coating. Alkali metal salts of carboxylic acids, such as potassium formate, are one class of such catalysts. The amine carboxylates and quaternary ammonium carboxylates are another such class of catalysts. Of course the catalysts must be soluble or at least miscible in the cosolvent system. The catalysts are latent to the extent that at room temperature they do not appreciably shorten the bath life of the composition, but upon heating the catalyst dissociates and generates a catalytic species active to promote condensation, for example an amine. Buffered catalysts can be used to avoid effects on the pH of the composition. Certain of the commercially available colloidal silica dispersions contain free alkali metal base which reacts with the organic acid during the adjustment of pH to generate the carboxylate catalysts in situ. This is particularly true when starting with a hydrosol having a pH of 8 or 9. The compositions can be catalyzed by addition of carboxylate such as dimethylamine acetate, ethanolamine acetate, dimethylaniline formate, tetraethylammonium benzoate, sodium acetate, sodium propionate, sodium formate or benzyltrimethylammonium acetate. Sulfonic acids such as toluene sulfonic acid can also be used. The amount of catalyst can be varied depending upon the desired curing condition, but at about 1.5 weight percent catalyst in the composition, the life of the resin is shortened and optical properties of the coating may be impaired. It is preferred to utilize from about 0.05 to 1 weight percent of the catalyst.

To provide the greatest stability in the dispersion form while obtaining optimum properties in the cured coating, it is preferred to utilize a coating composition having a pH below about 7.5.

The coating compositions of the invention can be applied to solid substrates by conventional methods, such as flowing, spraying, or dipping to form a continuous surface film. Although substrates of soft plastic sheet material show the greatest improvement upon application of the coating, the composition can be applied to other substrates, such as wood, metal, printed surfaces, leather, glass, ceramics and textiles. As noted above, the compositions are especially useful as coatings for dimensionally stable synthetic organic polymeric substrates in sheet or film form, such as acrylic polymers, for example, poly(methylmethacrylate), polyesters, for example poly(ethyleneterephthalate) and polycarbonates, such as poly(diphenylolpropane) carbonate and poly(diethylene glycol bis allyl) carbonate, polyamides, polyimides, copolymers of acrylonitrile-styrene, styrene-acrylonitrile-butadiene copolymers, polyvinyl chloride, butyrates, polyethylene and the like. Transparent polymeric materials coated with these compositions are useful as flat or curved enclosures, such as windows, skylights and windshields, especially for transportation equipment. Plastic lenses, such as acrylic or polycarbonate opthalmic lenses, can be coated with the compositions of the invention. In certain applications requiring high optical resolution, it may be desirable to filter the coating composition prior to applying it to the substrate. In other applications, such as corrosion-resistant coatings on metals, the slight haziness (less than 5%) obtained by the use of certain formulations, such as those containing citric acid and sodium citrate is not detrimental and filtration is not necessary.

By choice of proper formulation, including solvent, application conditions and pretreatment (including the use of primers) of the substrate, the coatings can be adhered to substantially all solid surfaces. A hard solvent-resistant surface coating is obtained by removal of the solvent and volatile materials. The composition will air dry to a tack-free condition, but heating in the range of 50° C. to 200° C. is necessary to obtain condensation of the silanols in the partial condensate and cause the composition to cure. This final cure results in the formation of reaction products between the silanols of the silsesquioxanes, the colloidal silica and the carbinols of the phenolic resin which greatly enhances the integrity and abrasion and corrosion resistance of the cured film or coating. The coating thickness can be varied by means of the particular application technique, but coatings of about 0.5 to 20 micron, preferably 2 to 10 micron thickness are generally used.

The following examples are illustrative only and are not intended to limit the invention delineated in the claims.

Films were cast from the coating compositions (in Examples 1–9) on glass, polycarbonate, acrylic and aluminum substrates. Hard, clear coatings were formed and cured. The coatings on acrylic substrate were cured at 80° C. and the coatings on the other substrates were cured at 110° C. The curing time for all the coating was about six hours except 2 hours for coating on aluminum substrate.

The cured coating was subjected to the following tests:

Hardness:

This test was performed on the coatings on glass substrates. In this test, pencil leads are employed having varying degree of hardness corresponding to the scale 3B, 2B, B, F, H, 2H, 3H, 4H, 5H, etc. These values represent a progression in hardness. Pencil leads of increasing hardness are held at 45° angle relative to the coating as laid down on the glass substrate and moderate force is applied until the coating is removed. The hardest lead that does not remove the coating is reported as the pencil hardness.

Abrasion Resistance: (haze)

This is a test to determine abrasion resistance of the coating by subjecting the coating to circular rubbing with a Tabor abraser and measuring the difference in % Haze, before and after abrading, on the Gardner haze meter. A load of 1,000 grams was used on a cs-10 calibrase wheel for 500 revolutions in each test. The results are reported in Haze.

Pencil Eraser Test:

This quick method of scratch resistance of a coating involves rubbing an ordinary pencil eraser against the coating ten times and observing the extent of scratching. The results are reported subjectively.

Adhesion Test:

This test is to measure the adhesion of the coating to the substrate by pulling Scotch brand tape three times from a ⅛ inch crosshatched grid of the coating. The % of grid squares remaining are recorded as % adhesion. The substrates used here are polycarbonate and acrylic.

Corrosion against HCl acid:

Test 1: This test was performed by dipping a test coated metal strip in a solution containing $CuSO_4$, $5H_2O$ (20% by wt.), conc. HCl acid (10%) and $H_2O$ (70%) for five minutes at room temperature. The coated surface was then examined for corrosion and the results are reported subjectively.

Test 2: If no damage was observed, the same dipping procedure was repeated after a thin line was scribed thru the coating onto the metal surface. The corrosion was examined in the vicinity of the scribe. The metal strips tested were aluminum. They were purchased from the Q-Panel Company in Cleveland, Ohio.

Test 3: A more severe test is to expose a scribed panel (coated) to concentrated HCl vapor in the presence of air for 30 minutes.

P.C. is polycarbonate (Lexan ®, manufactured by General Electric Plastics Division, Pittsfield, Mass., USA). ARC is acrylic (Plexiglas ® manufactured by Rohm and Haas, Philadelphia, Pa., USA). Scotch brand tape is manufactured by 3M Company, Minneapolis, Minn., USA.

All the substrates except glass were cleaned prior to the coating. The pencil hardness and eraser tests were performed on the coatings cast on glass substrate. The abrasion resistance test was done on all the coatings on polycarbonate substrate and some of the coatings on acrylic substrate. All the coatings were cast from the fresh coating solutions (less than 12 hours old). The HCl acid corrosion test was carried out on some of the coatings on aluminum substrate. The test results are given in the following tables. The ranking of eraser test results and corrosion test results were as follows:

| Eraser Test | Corrosion Test |
| --- | --- |
| 1: badly abraded | badly corroded |
| 2: abraded | corroded |
| 3: slightly abraded | slightly corroded |
| 4: very slightly abraded | very slightly corroded |
| 5: not abraded | not corroded |

EXAMPLE 1

Preparation of aqueous compositions of this invention was carried out by the following illustrative example.

The following ingredients were added to a 4 oz. glass bottle. $CH_3Si(OCH_3)_3$, 2 gms was added to and mixed with 11.8 gms of 1034A silica (Nalcoag 1034A obtained from Nalco Chemical Co., 34% solids; mean particle size of 200A, pH of 3.2; surface area of 150 $m^2/gm$; viscosity of 10 Cp and an $Na_2O$ content of 0.03%) and thereafter, 0.6 gms of acetic acid was added. The mixture was shaken to homogenize the ingredients and then 10 gms of Resinox-RS7101 (a heat cured phenolic resin manufactured by Monsanto Co. having a number average molecular weight of 200–250; solids of 51–53%; pH @ 25° C. of 1.175–1.215. It is reddish brown in color); 6 gms of isopropanol and 15 gms of butyl Cellosolve ® (registered trademark of the Dow Chemical Co., Midland, Mich., USA) were added and the mixture was again shaken to homogenize. The pH of this mixture was about 3.0.

For those compositions that do not contain $SiO_2$, the compositions were prepared in the following manner. Five grams of the phenolic resin, @ 50% solids by weight in water (Resinox-RS7101), were placed in a small glass vial and to this resin there was added 5 gms of $CH_3Si(OCH_3)_3$ and the two were shaken and mixed. There was then added 1.6 gms of acetic acid, 2.7 gms of isopropanol and 8 gms of Butyl Cellosolve½ (Dow Chemical Co., Midland, Mich.) the mixture was mixed by hand shaking until homogeneous. The ph of the solution was about 3.0.

For those compositions that contain only the phenolic resin and the colloidal silica, the compositions were prepared in the following manner.

Five grams of the pheolic resin, @ 50% solids by weight in water (Resinox-RS7101), were placed in a small glass vial and to this resin was added 7.3 gms of 1034A colloidal silica. There was then added 0.6 gms of acetic acid, 10 gms of ethylcellosolve (Dow Chemical Co., Midland, Mich.) and the vial was hand shaken to homogenize the mixture. The mixture was clear and had a ph of 3.5.

The compositions prepared in this manner are set forth in Table I. The results can be found in Table X.

EXAMPLE 3

Use of mercaptofunctionalsilane in the inventive compositions

The procedure was the same as used in example 1 and the silica was 1034A and the phenolic resin was Resinox-RS7101. The formulations are tabulated in Table III. The results can be found in Table X.

TABLE I

| | Formulations of Aqueous Compositions of This Invention | | | | | | | | |
|---|---|---|---|---|---|---|---|---|---|
| Sample | % Silica | Phenolic % Resin | Hydrolyzate % | $SiO_2$ gms | Phenolic Resin/gms | Silane* gms | $CH_3COOH$ gms | IPA gms | Butyl Cellosolve (gms) |
| a | 40 | 50 | 10 | 11.8 | 10 | 2 | 0.6 | 3.0 | 15.0 |
| b | 30 | 50 | 20 | 4.5 | 5 | 2 | 0.4 | 2.5 | 7.5 |
| c | 20 | 50 | 30 | 3.0 | 5 | 3 | 0.4 | 2.7 | 8.2 |
| d | 10 | 50 | 40 | 1.5 | 5 | 4 | 0.8 | 2.7 | 8.0 |
| e | 0 | 50 | 50 | 0 | 5 | 5 | 1.6 | 2.7 | 8.0 |
| f | 45 | 50 | 5 | 6.6 | 5 | 0.5 | 0.4 | 2.6 | 8.0 |
| g# | 0 | 100 | 0 | 0 | 5 | 0 | 0.6 | 1.4 | 4.0 |
| h | 50 | 50 | 0 | 7.3 | 5 | 0 | 0.8 | 3.0 | 8.1 |
| i | 60 | 30 | 10 | 8.8 | 3 | 1 | 0.8 | 2.8 | 8.1 |
| j | 30 | 60 | 10 | 4.4 | 6 | 1 | 0.7 | 2.9 | 8.1 | small amount of toluene sulfonic acid added to improve flow out and coatability on polycarbonate
*$CH_3Si(OCH_3)$
hydrolyzate = $CH_3SiO_{3/2}$

EXAMPLE 2

TABLE III

| | Formulations of Aqueous Compositions of This Invention | | | | | | | | |
|---|---|---|---|---|---|---|---|---|---|
| Sample | % Silica | Phenolic % Resin | Hydrolyzate % | $SiO_2$ gms | Phenolic Resin/gms | Silane* gms | $CH_3COOH$ gms | IPA gms | Butyl Cellosolve (gms) |
| s | 0 | 50 | 50 | 0 | 5 | 3.9 | 0.6 | 2.8 | 8.3 |
| t | 45 | 50 | 5 | 6.6 | 5 | 0.39 | 0.6 | 3.0 | 8.2 |
| u | 40 | 50 | 10 | 5.9 | 5 | 0.78 | 0.7 | 3.0 | 8.5 |
| v | 30 | 50 | 20 | 4.4 | 5 | 1.6 | 0.8 | 3.0 | 8.4 |
| w | 20 | 50 | 30 | 3.0 | 5 | 2.3 | 0.9 | 3.0 | 8.2 |
| x | 10 | 50 | 40 | 1.5 | 5 | 3.1 | 0.9 | 3.0 | 8.4 |
| y | 60 | 30 | 10 | 8.8 | 3 | 0.8 | 0.7 | 3.0 | 8.2 |
| z | 30 | 60 | 10 | 4.4 | 6 | 0.8 | 0.7 | 3.0 | 8.2 |

*$(CH_3O)_3Si(CH_2)_3SH$
Hydrolyzate: $HS(CH_2)_3SiO_{3/2}$

Use of the epoxy functionalsilane in the inventive compositions

The procedure used to formulate the following compositions was essentially the same as that in example 1, above. The formulations are tabulated in Table II. The silica used was 1034A; the phenolic resin was Resinox-RS7101. The results can be found in Table X.

EXAMPLE 4

Use of acryloxyfunctionalsilane in the inventive compositions

The procedure was the same as used in example 1 and the silica was 1034A and the phenolic resin was Resinox-RS7101. The formulations are tabulated in Table IV. The results can be found in Table X.

TABLE II

| | Formulations of Aqueous Compositions of This Invention | | | | | | | | |
|---|---|---|---|---|---|---|---|---|---|
| Sample | % Silica | Phenolic % Resin | Hydrolyzate % | $SiO_2$ gms | Phenolic Resin/gms | Silane* gms | $CH_3COOH$ gms | IPA gms | Butyl Cellosolve (gms) |
| k | 0 | 50 | 50 | 0 | 5 | 3.5 | 0.6 | 2.5 | 8.3 |
| l | 45 | 50 | 5 | 6.6 | 5 | 0.4 | 0.4 | 2.7 | 8.1 |
| m | 40 | 50 | 10 | 6.0 | 5 | 0.7 | 0.4 | 2.7 | 8.1 |
| n | 30 | 50 | 20 | 4.5 | 5 | 1.4 | 0.6 | 2.7 | 8.1 |
| o | 20 | 50 | 30 | 3.0 | 5 | 2.1 | 0.9 | 2.7 | 8.2 |
| p | 10 | 50 | 40 | 1.5 | 5 | 2.8 | 1.2 | 2.7 | 8.2 |
| q | 60 | 30 | 10 | 8.8 | 3 | 0.7 | 0.7 | 2.8 | 8.5 |
| r | 30 | 60 | 10 | 4.4 | 6 | 0.7 | 2.8 | 3.0 | 8.2 |

*$(CH_3O)_3Si(CH_2)_3OCH_2CH\underset{O}{-\!\!-\!\!-}CH_2$

Hydrolyzate: $CH_2\underset{O}{-\!\!-\!\!-}CHCH_2O(CH_2)_3SiO_{3/2}$

TABLE IV

| | | Formulations of Aqueous Compositions of This Invention | | | | | | | |
|---|---|---|---|---|---|---|---|---|---|
| Sample | % Silica | Phenolic % Resin | Hydrolyzate % | SiO₂ gms | Phenolic Resin/gms | Silane* gms | CH₃COOH gms | IPA gms | Butyl Cellosolve (gms) |
| aa | 45 | 50 | 5 | 6.6 | 5 | 0.35 | 0.6 | 2.8 | 8.3 |
| bb | 40 | 50 | 10 | 5.9 | 5 | 0.70 | 0.6 | 2.7 | 8.3 |
| cc | 30 | 50 | 20 | 4.4 | 5 | 1.4 | 0.6 | 2.7 | 8.2 |
| dd | 20 | 50 | 30 | 3.0 | 5 | 2.0 | 0.6 | 2.7 | 8.2 |
| ee | 10 | 50 | 40 | 1.5 | 5 | 2.8 | 0.7 | 2.8 | 8.3 |
| ff | 0 | 50 | 50 | 0 | 5 | 3.6 | 0.6 | 2.7 | 8.4 |
| gg | 60 | 30 | 10 | 8.8 | 3 | 0.7 | 0.7 | 3.0 | 8.5 |
| hh | 30 | 60 | 10 | 4.4 | 6 | 0.7 | 0.7 | 2.7 | 8.6 |

*$(CH_3O)_3Si(CH_2)_3OC(=O)-C(CH_3)=CH_2$

Hydrolyzate: $CH_2=C(CH_3)-C(=O)O(CH_2)_3SiO_{3/2}$

EXAMPLE 5

Use of chloropropylsilane in the inventive compositions

The procedure was the same as used in example 1 and the silica was 1034A and the phenolic resin was Resinox-RS7101. The formulations are tabulated in Table V. The results can be found in Table X.

TABLE V

| | | Formulations of Aqueous Compositions of This Invention | | | | | | | |
|---|---|---|---|---|---|---|---|---|---|
| Sample | % Silica | Phenolic % Resin | Hydrolyzate % | SiO₂ gms | Phenolic Resin/gms | Silane* gms | CH₃COOH gms | IPA gms | Butyl Cellosolve (gms) |
| ii | 45 | 50 | 5 | 6.6 | 5 | 0.38 | 0.6 | 2.9 | 8.2 |
| jj | 40 | 50 | 10 | 5.9 | 5 | 0.76 | 0.7 | 2.8 | 8.2 |
| kk | 30 | 50 | 20 | 4.4 | 5 | 1.5 | 0.7 | 2.8 | 8.3 |
| ll | 10 | 50 | 30 | 3.0 | 5 | 2.3 | 0.8 | 3.0 | 8.4 |
| mm | 10 | 50 | 40 | 1.5 | 5 | 3.0 | 0.8 | 2.9 | 8.3 |
| nn | 0 | 50 | 50 | 0 | 5 | 3.8 | 0.7 | 2.9 | 8.3 |
| oo | 60 | 30 | 10 | 8.8 | 3 | 0.76 | 0.8 | 2.9 | 8.4 |
| pp | 30 | 60 | 10 | 4.4 | 6 | 0.76 | 0.8 | 3.5 | 8.5 |

*$(CH_3O)_3Si(CH_2)_3Cl$
Hydrolyzate: $Cl(CH_2)_3SiO_{3/2}$

EXAMPLE 6

Use of phenyltrimethoxysilane in the inventive compositions

The procedure was the same as used in example 1 and the silica was 1034A and the phenolic resin was Resinox-RS7101. The formulations are tabulated in Table VI. The results can be found in Table X.

TABLE VI

| | | Formulations of Aqueous Compositions of This Invention | | | | | | | |
|---|---|---|---|---|---|---|---|---|---|
| Sample | % Silica | Phenolic % Resin | Hydrolyzate % | SiO₂ gms | Phenolic Resin/gms | Silane* gms | CH₃COOH gms | IPA gms | Butyl Cellosolve (gms) |
| qq | 45 | 50 | 5 | 6.6 | 5 | 0.4 | 0.7 | 2.8 | 8.2 |
| rr | 40 | 50 | 10 | 5.9 | 5 | 0.8 | 0.7 | 2.8 | 8.2 |
| ss | 30 | 50 | 20 | 4.4 | 5 | 1.5 | 0.7 | 2.8 | 8.2 |
| tt | 10 | 50 | 30 | 3.0 | 5 | 2.3 | 1.5 | 2.8 | 8.2 |
| uu | 10 | 50 | 40 | 1.5 | 5 | 3.1 | 0.8 | 2.8 | 8.2 |
| vv | 0 | 50 | 50 | 0 | 5 | 3.8 | 0.7 | 2.8 | 8.4 |
| ww | 60 | 30 | 10 | 8.8 | 3 | 0.7 | 0.7 | 2.8 | 8.5 |
| xx | 30 | 60 | 10 | 4.4 | 6 | 0.7 | 0.7 | 2.8 | 8.2 |

*$C_6H_5Si(OCH_3)_3$
Hydrolyzate = $C_6H_5SiO_{3/2}$

EXAMPLE 7

Coating compositions containing mixtures of $CH_3Si(OCH_3)_3$ and $$(CH_3O)_3Si(CH_2)_3OCH_2CH\underset{O}{\overset{\diagdown\diagup}{-}}CH_2$$

The compositions are set forth in Table VII. The results can be found in Table X.

TABLE VII

| | %* HYDROLYZATE | %** HYDROLYZATE | % PHENOLIC RESIN | SILANE I | SILANE II | PHENOLIC RESIN | CH₃COOH | IPA | BUTYL CELLOSOLVE |
|---|---|---|---|---|---|---|---|---|---|
| a | 10 | 40 | 50 | 2.0 g | 5.6 g | 10 g | 1.4 g | 5.7 g | 16.3 g |
| b | 20 | 30 | 50 | 4.0 g | 4.2 g | 10 g | 1.4 g | 5.7 g | 16.2 g |
| c | 30 | 20 | 50 | 6.0 g | 2.8 g | 10 g | 1.4 g | 5.7 g | 16.4 g |
| d | 40 | 10 | 50 | 8.0 g | 1.4 g | 10 g | 1.4 g | 6.0 g | 16.7 g |

TABLE VII-continued

| | Formulations of Aqueous Compositions of this Invention | | | | | | | | |
|---|---|---|---|---|---|---|---|---|---|
| | %* HYDROL-YZATE | %** HYDROL-YZATE | % PHENOLIC RESIN | SILANE I | SILANE II | PHENOLIC RESIN | CH$_3$COOH | IPA | BUTYL CELLOSOLVE |
| e | 45 | 5 | 50 | 9.0 g | 0.7 g | 10 g | 1.4 g | 5.8 g | 16.3 g |
| f | 47 | 3 | 50 | 9.4 g | 0.4 g | 10 g | 1.4 g | 6.0 g | 16.4 g |
| g | 49 | 1 | 50 | 9.8 g | 0.1 g | 10 g | 1.4 g | 6.0 g | 16.4 g |
| h | 50 | 0 | 50 | 10.0 g | 0 | 10 g | 1.4 g | 6.0 g | 16.4 g |
| i | 30 | 10 | 60 | 6.0 g | 1.4 g | 12 g | 1.4 g | 6.0 g | 16.4 g |
| j | 35 | 5 | 60 | 7.0 g | 0.7 g | 12 g | 1.4 g | 6.0 g | 16.4 g |
| k | 37 | 3 | 60 | 7.4 g | 0.4 g | 12 g | 1.4 g | 6.0 g | 16.4 g |
| l | 39 | 1 | 60 | 7.8 g | 0.1 g | 12 g | 1.4 g | 6.0 g | 16.4 g |
| m | 20 | 10 | 70 | 4.0 g | 1.4 g | 14 g | 1.4 g | 6.0 g | 16.4 g |
| o | 25 | 5 | 70 | 5.0 g | 0.7 g | 14 g | 1.4 g | 6.0 g | 16.4 g |
| p | 27 | 3 | 70 | 6.4 g | 0.4 g | 14 g | 1.4 g | 6.0 g | 16.4 g |
| q | 29 | 1 | 70 | 5.8 g | 0.1 g | 14 g | 1.4 g | 6.0 g | 16.4 g |
| r | 10 | 10 | 80 | 2.0 g | 1.4 g | 16 g | 1.4 g | 6.0 g | 16.4 g |
| s | 15 | 5 | 80 | 3.0 g | 0.7 g | 16 g | 1.4 g | 6.0 g | 16.4 g |
| t | 17 | 3 | 80 | 3.4 g | 0.4 g | 16 g | 1.4 g | 6.0 g | 16.4 g |
| u | 19 | 1 | 80 | 3.8 g | 0.1 g | 16 g | 1.4 g | 6.0 g | 16.4 g |
| v | 5 | 5 | 90 | 1.0 g | 0.7 g | 18 g | 1.4 g | 6.0 g | 16.4 g |
| w | 7 | 3 | 90 | 1.4 g | 0.4 g | 18 g | 1.4 g | 6.0 g | 16.4 g |
| x | 9 | 1 | 90 | 1.8 g | 0.1 g | 18 g | 1.4 g | 6.0 g | 16.4 g |

*CH$_3$SiO$_{3/2}$
**CH$_2$CHCH$_2$O(CH$_2$)$_3$SiO$_{3/2}$ 

Silane I = CH$_3$Si(OCH$_3$)$_3$
Silane II = (CH$_3$O)$_3$Si(CH$_2$)$_3$OCH$_2$CH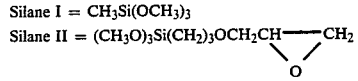CH$_2$

EXAMPLE 8

Coating compositions containing CH$_3$Si(OCH$_3$)$_3$ and (CH$_3$O)$_3$SiCH$_2$CH$_2$CH$_2$NCH$_2$CH$_2$NH$_2$
                                         H were also prepared. The presence of (CH$_3$O)$_3$-Si(CH$_2$)$_3$NHCH$_2$CH$_2$NH$_2$ increases the abrasion resistance of the coating. The formulations are set forth on Table VIII. The results can be found in Table X.

TABLE VIII

| | Formulations of Aqueous Compositions of this Invention | | | | | | | | |
|---|---|---|---|---|---|---|---|---|---|
| | % HYDROLY-ZATE* | % HYDROLY-ZATE** | % PHENOLIC RESIN | SILANE I | SILANE II | PHENOLIC RESIN | CH$_3$COOH | IPA | BUTYL CELLOSOLVE |
| a | 40 | 10 | 50 | 4.0 g | 0.7 g | 5 g | 0.7 g | 3.0 g | 9.0 g |
| b | 30 | 20 | 50 | 3.0 g | 1.4 g | 5 g | 0.7 g | 3.0 g | 9.0 g |
| c | 20 | 30 | 50 | 2.0 g | 2.1 g | 5 g | 0.7 g | 3.0 g | 9.1 g |
| d | 45 | 5 | 50 | 4.5 g | 0.35 g | 5 g | 0.7 g | 3.2 g | 9.1 g |

*CH$_3$SiO$_{3/2}$
**NH$_2$(CH$_2$)$_2$NH(CH$_2$)$_3$SiO$_{3/2}$
Silane I = CH$_3$Si(OCH$_3$)$_3$
Silane II = (CH$_3$O)$_3$Si(CH$_2$)$_3$NH(CH$_2$)$_2$NH$_2$

EXAMPLE 9

This procedure is the same as in example 1. The silane used was CH$_2$=CHSi(OCH$_3$)$_3$. The formulations are set forth in Table IX. The results can be found in Table X.

TABLE IX

| | Formulations of Aqueous Compositions of this Invention | | | | | | | |
|---|---|---|---|---|---|---|---|---|
| | % SILICA | PHENOLIC RESIN | % HYDROLY-ZATE* | SILICA | PHENOLIC RESIN | CH$_2$=CHSi(OCH$_3$)$_3$ | CH$_3$COOH | IPA | BUTYL CELLOSOLVE |
| a | 45 | 50 | 5 | 6.6 g | 5 g | 0.5 g | 0.7 g | 3 g | 8 g |
| b | 40 | 50 | 10 | 6.0 g | 5 g | 1.0 g | 0.7 g | 3 g | 8 g |
| c | 20 | 50 | 30 | 3.0 g | 5 g | 2.8 g | 0.7 g | 3 g | 8 g |
| d | 0 | 50 | 50 | 0 | 5 g | 4.7 g | 0.7 g | 3 g | 8 g |
| e | 60 | 30 | 10 | 8.8 g | 3 g | 1.0 g | 0.7 g | 3 g | 8 g |
| f | 30 | 60 | 10 | 4.4 g | 6 g | 1.0 g | 0.7 g | 3 g | 8 g |

*Hydrolyzate—CH$_2$=CHSiO$_{3/2}$ 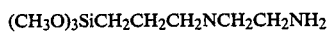

EXAMPLE 10

Other silica sols were also used as a source of colloidal silica particles. They were:
1. Nalcoag 1129[(1)]: Acidic Sol (pH=3.5), 30% SiO$_2$, 30% H$_2$O and 40% isopropyl alcohol, particle size=200 Å.
2. Ludox AS-40[(2)]: NH$_4$+ stabilized basic sol (pH=9.6), 40% silica and 60% H$_2$O, particle size=130-140 Å.
3. Ludox TM [(2)]: Na+ stablized basic sol (pH=8.9), 49.5% silica and 50.5% H$_2$O, particle size=210-240 Å.
4. (EtO)$_4$Si hydrolyzate: 50 g (EtO)$_4$Si, 35 g IPA and 75 g. 0.05 N HCl. (Et=C$_2$H$_5$—)

The preparation of coating compositions using the above silica sols is the same as described in example 1. The compositions were coated on polycarbonate panels. Test results on the coatings cast from the above coating compositions are in Table XI.
(1) Nalco Chemical Company
(2) DuPont de Nemours & Co.

TABLE X

Test Results

| Sample | Pencil Hardness | Eraser Test | Haze (P.C.) | Haze (Acrylic) | HCL Acid Corrosion Test Test 1 | Test 2 Scribed | Test 3 Scribed |
|---|---|---|---|---|---|---|---|
| a | 6–7 H | 3 | 3.1 | — | — | — | — |
| b | 6–7 H | 3 | 3.2 | — | — | — | — |
| c | 6–7 H | 3 | 1.3 | — | — | — | — |
| d | 6–7 H | 3 | 2.1 | — | 5 | 5 | 3 |
| e | 6–7 H | 3 | 4.5 | — | 5 | 5 | 2 |
| f | 6–7 H | 3 | 3.2 | — | 5 | 5 | 5 |
| g | 6 H | 2 | 14.7 | — | 5 | 5 | 4 |
| h | 6–7 H | 3 | 2.4 | — | 5 | 5 | 5 |
| i | 6 H | 3 | 3.4 | — | — | — | — |
| j | 6 H | 3 | — | — | — | — | — |
| k | 6–7 H | 4 | 1.5 | — | — | — | — |
| l | 6–7 H | 4 | 4.0 | 4.3 | 5 | 5 | 4 |
| m | 6–7 H | 4 | 2.6 | — | — | — | — |
| n | 6–7 H | 4 | 2.3 | — | — | — | — |
| o | 6–7 H | 4 | 2.6 | — | — | — | — |
| p | 6–7 H | 4 | 2.4 | — | 5 | 5 | 1–2 |
| q | 8 H | 5 | 1.0 | — | — | — | — |
| r | 7 H | 4 | 2.0 | — | — | — | — |
| polycarbonate blank | — | — | 20 | — | — | — | — |
| s | 6 H | 2 | 4.5 | — | 5 | 4 | 3 |
| t | 6 H | 3 | 3.6 | — | 5 | 5 | 4 |
| u | — | — | 2.2 | — | — | — | — |
| v | — | — | 1.3 | — | — | — | — |
| w | — | — | 2.0 | — | — | — | — |
| x | — | — | 5.8 | — | 5 | 5 | 3–4 |
| y | — | — | 1.4 | — | 5 | 5 | 5 |
| z | — | — | 2.8 | — | — | — | — |
| aa | — | hazy coating | — | — | 5 | 5 | 5 |
| ee | — | hazy coating | — | — | 4 | 3 | 1 |
| ff | — | hazy coating | — | — | 4 | 3 | 1 |
| gg | 6 H | 3 | 3.4 | — | 5 | 5 | 5 |
| ii | 7 H | 4 | 6.2 | — | — | — | — |
| jj | 6 H | 3 | 6.8 | — | — | — | — |
| oo | 6 H | 3 | 3.8 | — | 5 | 5 | 5 |
| pp | 7 H | 4 | hazy | — | 5 | 5 | 5 |
| qq | 7 H | 4 | 3.6 | — | — | — | — |
| rr | 7 H | 4 | 8.1 | — | — | — | — |
| ww | 7 H | 4 | 2.2 | — | 5 | 5 | 5 |
| xx | 7 H | 4 | 5.2 | — | 5 | 5 | 5 |
| 7-a | 7 H | 4 | 1.0 | — | — | — | — |
| 7-b | 6 H | 4 | 1.1 | — | — | — | — |
| 7-c | 6 H | 4 | 0.5 | — | — | — | — |
| 7-d | 6 H | 3 | 1.6 | — | 5 | 5 | 2–3 |
| 7-e | 6 H | 3 | 1.7 | — | — | — | — |
| 7-f | — | — | 0.3 | — | — | — | — |
| 7-g | 6 H | 3 | 3.0 | — | 5 | 5 | 3 |
| 7-h | 6 H | 3 | 10.5 | — | — | — | — |
| 7-i | 6 H | 3 | 2.4 | — | 5 | 5 | 5 |
| 7-j | — | — | 3.1 | — | — | — | — |
| 7-k | — | — | 4.5 | — | — | — | — |
| 7-l | 6 H | 3 | — | — | 5 | 5 | 3–4 |
| 7-m | — | — | 2.5 | — | 5 | 5 | 5 |
| 7-o | — | — | 5.4 | — | — | — | — |
| 7-p | — | — | 3.0 | — | — | — | — |
| 7-q | 6 H | 4 | 3.5 | — | 5 | 5 | 5 |
| 7-r | 6 H | 3 | 3.9 | — | 5 | 5 | 4 |
| 7-s | — | — | 2.4 | — | — | — | — |
| 7-t | — | — | 2.3 | — | — | — | — |
| 7-u | 5 H | 3 | — | — | 5 | 5 | 5 |
| 7-v | 4 H | 2 | 4.4 | — | 5 | 5 | 5 |
| 7-w | — | — | 3.5 | — | — | — | — |
| 7-x | 5 H | 3 | — | — | — | — | — |
| 8-a | — | — | 3.6 | — | 5 | 5 | 5 |
| 8-d | — | — | 6.9 | — | 5 | 5 | 5 |
| 9-a | 6 H | 3 | — | — | 5 | 5 | 3–4 |
| 9-b | 6 H | 3 | hazy | — | — | — | — |
| 9-c | 6 H | 3 | hazy | — | 5 | 5 | 1–2 |
| 9-d | 6 H | 3 | hazy | — | — | — | — |
| 9-e | 6 H | 3 | 3.4 | — | 5 | 5 | 4 |
| 9-f | 6 H | 3 | — | — | 5 | 5 | 3 |

TABLE XI

Results of Varying the SiO₂ Source

| | % SiO$_2$ | % CH$_3$SiO$_{3/2}$ Hydrolyzate | % Phenolic Resin | Haze |
|---|---|---|---|---|
| 1. Nalcoag 1120 used as silica source | | | | |
| Example 11-a | 50 | 0 | 50 | 4.3 |
| Example 11-b | 45 | 5 | 50 | 4.0 |
| Example 11-c | 30 | 20 | 50 | 6.3 |
| 2. Ludox AS-40 used as silica source | | | | |
| Example 11-d | 49 | 1 | 50 | 3.2 |
| Example 11-*e | 49 | 1 | 50 | 4.4 |
| 3. Ludox TM used as silica source | | | | |
| Example 11-f | 49 | 1 | 50 | 3.7 |
| Example 11-g | 49 | 1 | 50 | 4.1 |
| 4. (EtO)$_4$Si hydrolyzate used a silica source | | | | |
| Example 11-h | 50 | 0 | 50 | badly abraded |
| Example 11-i | 45 | 5 | 50 | 1.5 |

*Silica sol was acidified with acetic acid and the coating solution was acidic.

That which is claimed is:

1. An aqueous composition consisting essentially of
(A) 100 parts by weight phenolic resin;
(B) 1 to 100 parts by weight of colloidal silica; and
(C) 300 to 1900 parts by weight of water.

2. An aqueous composition as claimed in claim 1 wherein there is present a catalyst.

3. An aqueous composition as claimed in claim 2 wherein the catalyst is a condensation catalyst.

4. A solid substrate coated with the composition of claim 2 and the composition is cured.

5. An article coated with the composition of claim 2 and the composition is cured.

* * * * *